US011281962B2

(12) United States Patent
Zeiler et al.

(10) Patent No.: US 11,281,962 B2
(45) Date of Patent: Mar. 22, 2022

(54) PREDICTION-MODEL-BASED MAPPING AND/OR SEARCH USING A MULTI-DATA-TYPE VECTOR SPACE

(71) Applicant: Clarifai, Inc., New York, NY (US)

(72) Inventors: Matthew Zeiler, New York, NY (US); David Eigen, New York, NY (US); Ryan Compton, New York, NY (US); Christopher Fox, New York, NY (US)

(73) Assignee: Clarifai, Inc., New York, NY (US)

( * ) Notice: Subject to any disclaimer, the term of this patent is extended or adjusted under 35 U.S.C. 154(b) by 1033 days.

(21) Appl. No.: 15/717,133

(22) Filed: Sep. 27, 2017

(65) Prior Publication Data

US 2018/0089556 A1 Mar. 29, 2018

Related U.S. Application Data

(60) Provisional application No. 62/400,545, filed on Sep. 27, 2016.

(51) Int. Cl.
*G06F 15/18* (2006.01)
*G06N 3/08* (2006.01)
*G06N 3/04* (2006.01)

(52) U.S. Cl.
CPC ............. *G06N 3/0454* (2013.01); *G06N 3/08* (2013.01); *G06N 3/084* (2013.01)

(58) Field of Classification Search
CPC ......... G06N 3/0454; G06N 3/08; G06N 3/084
See application file for complete search history.

(56) References Cited

U.S. PATENT DOCUMENTS

| | | | |
|---|---|---|---|
| 2005/0265607 A1* | 12/2005 | Chang | G06K 9/6293 382/224 |
| 2015/0193486 A1* | 7/2015 | Moataz | G06F 16/245 707/741 |
| 2016/0099010 A1* | 4/2016 | Sainath | G06N 3/0454 704/232 |

OTHER PUBLICATIONS

Effective deep learning-based multi-modal retrieval, Wei Wang, The VLDB Journal (2016) 25:79-101, Published online: Jul. 19, 2015 (Year: 2015).*
Wang, MMSS: Multi-modal Sharable and Specific Feature Learning for RGB-D Object Recognition, 2015 IEEE International Conference on Computer Vision (Year: 2015).*

(Continued)

*Primary Examiner* — Kakali Chaki
*Assistant Examiner* — Su-Ting Chuang
(74) *Attorney, Agent, or Firm* — Buckley, Maschoff & Talwalkar LLC

(57) ABSTRACT

In certain embodiments, content items may be obtained, where each of the content items may include multiple data types. Machine learning models may be caused to be trained based on the content items to map data in a vector space by providing at least a first portion of each of the content items as input to at least one of the machine learning models and providing at least a second portion of each of the content items as input to at least another one of the machine learning models. A search request for results may be obtained, where the search request includes search parameters. One or more locations within the vector space may be predicted (e.g., by one or more of the machine learning models) based on the search parameters. Information (indicating content items mapped to or proximate the predicted locations) may be provided as a request response.

20 Claims, 4 Drawing Sheets

(56) References Cited

OTHER PUBLICATIONS

Ngiam, Multimodal Deep Learning, Proceedings of the 28th International Conference on Machine Learning (Year: 2011).*
Pourian ("Search and retrieval of multi-modal data associated with image-parts"), 2015 IEEE International Conference on Image Processing (ICIP) (Year: 2015).*

* cited by examiner

US 11,281,962 B2

PREDICTION-MODEL-BASED MAPPING AND/OR SEARCH USING A MULTI-DATA-TYPE VECTOR SPACE

RELATED APPLICATIONS

This application claims the benefit of U.S. Provisional Patent Application Ser. No. 62/400,545, filed on Sep. 27, 2016, entitled "Systems and Methods for Providing a Vector Search Platform," which is hereby incorporated by reference herein in its entirety.

FIELD OF THE INVENTION

The invention relates to vector-based item mapping and/or search, including, for example, prediction-model-based mapping and/or search using a multi-data-type vector space.

BACKGROUND OF THE INVENTION

Vector-space-based search systems provides a number of advantages over other types of search systems, including its tendencies for enabling computation of a continuous degree of similarity between queries and documents, ranking of documents according to their possible relevance, partial matching, or other beneficial tendencies. A vector space (or a vector database representing the vector space) in existing vector-space-based search systems, however, is typically limited for queries with respect to one media type, such as a vector space for text documents, a vector space for images, etc., and, thus, fails to accommodate content items having multiple media types (e.g., a web article having text, images, and video). These and other drawbacks exist.

SUMMARY OF THE INVENTION

Aspects of the invention relate to methods, apparatuses, and/or systems for facilitating prediction-model-based mapping and/or search using a multi-data-type vector space.

In some embodiments, the search and indexing of multiple different data types may be unified into one search space, such as a high dimensional vector space. As an example, the vector space may include 10 or more dimensions, 20 or more dimensions, 30 or more dimensions, 40 or more dimensions, 50 or more dimensions, 100 or more dimensions, 200 or more dimensions, 300 or more dimensions, 400 or more dimensions, 500 or more dimensions, 1000 or more dimensions, 5000 or more dimensions, 10000 or more dimensions, 10000 or more dimensions, or other number of dimensions. In some embodiments, machine learning models (such as neural networks) may be trained to map that data into vectors. The training process may attempt to map through multiple neural networks or other machine learning models (e.g., one per different type of data associated with a given item) to map the data types to the same point in the vector space for the various data types of the given item and map to different points in the vector space for data types of other dissimilar items. In some embodiments, the structure of the neural network (or machine learning model) for each data type may vary greatly depending on the data type. As an example, a convolutional network may be trained and used for mapping for images and videos to the vector space, whereas a convolution or a recurrent neural network may be trained and used for mapping sequence data (e.g., sentences, time series, etc.) to the vector space. As discussed, in some embodiments, an existing vector space may be extended by adding one or more additional dimensions to the vector space (e.g., to enable the vector space to accommodate new types of data by mapping aspects of the new types of data to the additional dimensions of the vector space). In some embodiments, one or more additional machine learning models may be trained to map the new types of data to the additional dimensions of the vector space.

When building a search system over many different types of data, one may choose how to store the data, how to index the data for efficient retrieval, how to combine searches across various types of data, etc. The foregoing multiple-data-type vector space approach simplifies the construction of a search system over heterogeneous data because all input types may be mapped into the same vector space. In effect, in some embodiments, there may only be a "single data type" to store and index in the search system. Searches involving multiple query terms, potentially of different types, may be performed efficiently via arithmetic operations on vectors. In some embodiments, an existing vector space may be extended by adding one or more additional dimensions to the vector space. In this way, for example, the vector space may accommodate new types of data by mapping aspects of the new types of data to the additional dimensions of the vector space. As such, incrementally adding new data types (e.g., to accommodate additional applications) and searching by those new data types across content already indexed in the same vector space may be made more feasible. For example, this may avoid the need for a developer to re-perform a full re-indexing of data already contained in the vector database representing the vector space.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
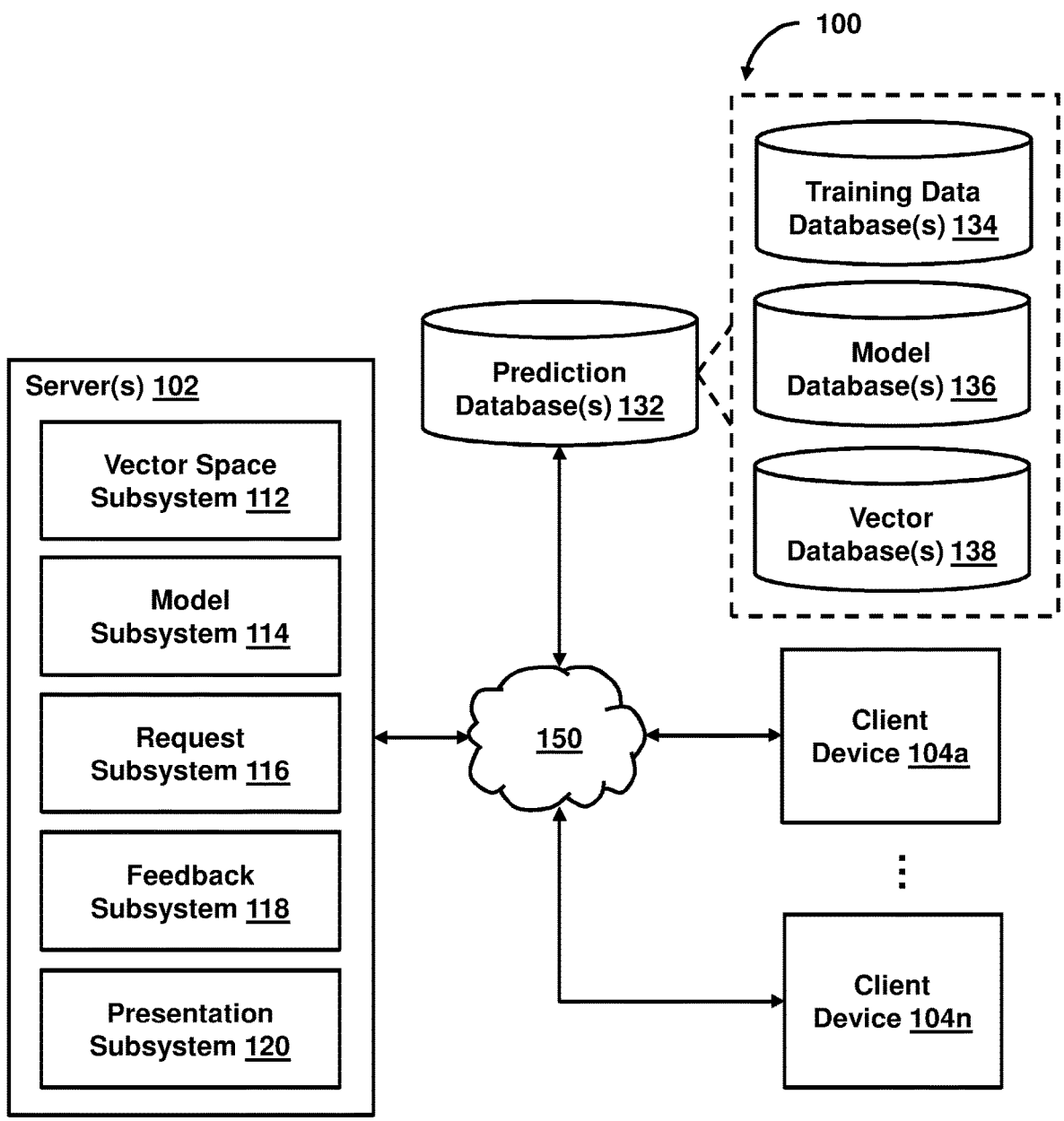
FIG. 1 shows a system for facilitating vector-based item mapping and/or search, in accordance with one or more embodiments.

FIG. 1 shows a system 100 for facilitating vector-based item mapping and/or search, in accordance with one or more embodiments. As shown in FIG. 1, system 100 may include server(s) 102, client device 104 (or client devices 104a-104n), or other components. Server 102 may include vector space subsystem 112, model subsystem 114, request subsystem 116, feedback subsystem 118, presentation subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104.

Vector-Based Item Mapping and/or Search

Figure 2A:
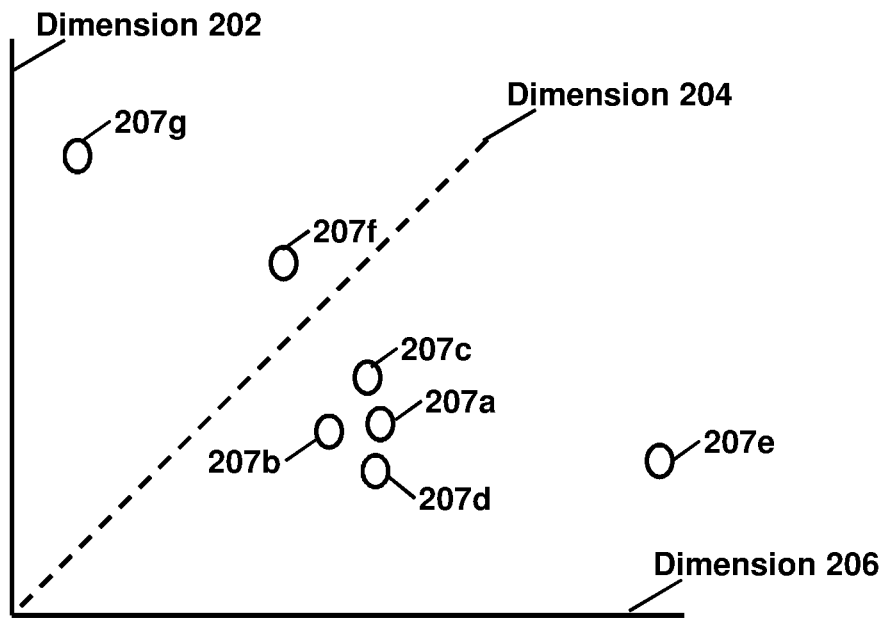
FIGS. 2A-2B show representations of a vector space and dimensions of the vector space, in accordance with one or more embodiments.
Figure 2B:
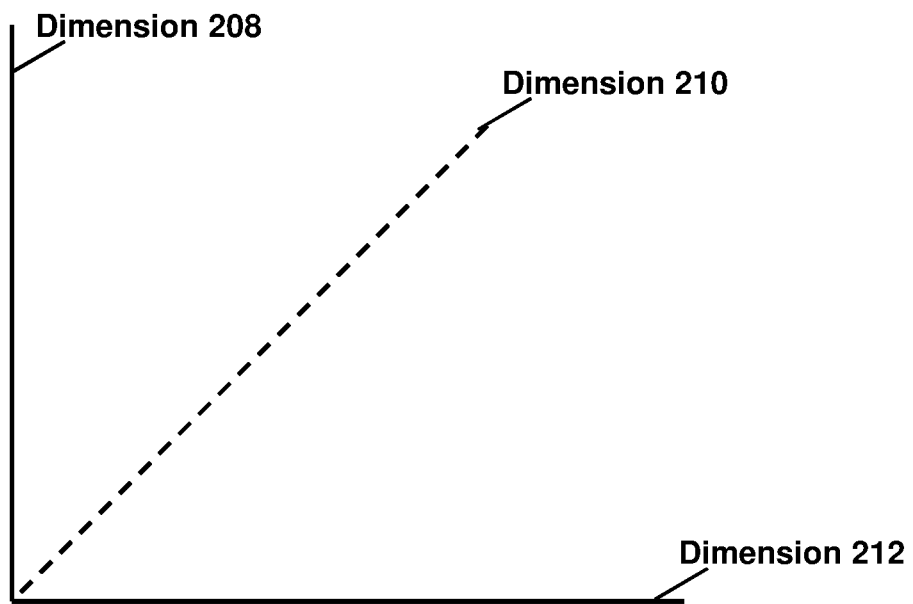

In some embodiments, system 100 may facilitate vector-based item mapping and/or search using a multi-data-type vector space. In some embodiments, the vector space may be a high-dimensional vector space. As an example, the vector space may include 10 or more dimensions, 20 or more dimensions, 30 or more dimensions, 40 or more dimensions, 50 or more dimensions, 100 or more dimensions, 200 or more dimensions, 300 or more dimensions, 400 or more dimensions, 500 or more dimensions, 1000 or more dimensions, 5000 or more dimensions, 10000 or more dimensions, 10000 or more dimensions, or other number of dimensions. As an example, FIGS. 2A and 2B may show a representation of six dimensions (e.g., dimensions 202-212) of a vector space (which may have many more dimensions) on which at least some aspects of a content item may be mapped. In some embodiments, a single vector may be generated for each input content, and the input content may be mapped to the vector space based on the single vector (e.g., a vector of N or less number of dimensions may be generated to represent the input content for a N-dimensional vector space). In some embodiments, multiple vectors may be generated for each input content, and the input content may be mapped to the vector space based on the multiple vectors. As an example, with respect to a single vector may represent a content item for a particular retailer's product that includes multiple product photos, tags, descriptions, star ratings, user reviews, etc., and the content item may be mapped to the vector space in accordance with the single vector. As another example, multiple vectors may represent the content item, and each of the multiple vectors may represent one or more of the multiple product photos, tags, descriptions, star ratings, user reviews, etc., of the content item. The content item and/or its corresponding portions may be mapped to the vector space based on the respective vectors.

When building a search system over many different types of data, one may choose how to store the data, how to index the data for efficient retrieval, how to combine searches across various types of data, etc. The foregoing multiple-data-type vector space approach simplifies the construction of a search system over heterogeneous data because all input types may be mapped into the same vector space. In effect, in some embodiments, there may only be a "single data type" to store and index in the search system. Searches involving multiple query terms, potentially of different types, may be performed efficiently via arithmetic operations on vectors. As an example, a Boolean AND query may be carried out by summing the vectors for the query terms and then searching over the vector space using this sum as a representation of the query. If one of the terms is negated in the query, its vector may be subtracted from the sum rather than added to it. In some embodiments, an existing vector space may be extended by adding one or more additional dimensions to the vector space. In this way, for example, the vector space may accommodate new types of data by mapping aspects of the new types of data to the additional dimensions of the vector space. As such, incrementally adding new data types (e.g., to accommodate additional applications) and searching by those new data types across content already indexed in the same vector space may be made more feasible. For example, this may avoid the need for a developer to re-perform a full re-indexing of data already contained in the vector database representing the vector space.

In some embodiments, system 100 may facilitate prediction-model-based mapping and/or search using a multi-data-type vector space. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, the search and indexing of multiple different data types may be unified into one search space. In some embodiments, machine learning models (such as neural networks) may be trained to map that data into vectors. The training process may attempt to map through multiple neural networks or other machine learning models (e.g., one per different type of data associated with a given item) to map the data types to the same point in the vector space for the various data types of the given item and map to different points in the vector space for data types of other dissimilar items. This is one example of a cost function to be optimized during the training of these various neural networks or other machine learning models. In some embodiments, the structure of the neural network (or machine learning model) for each data type may vary greatly depending on the data type. As an example, a convolutional network may be trained and used for mapping for images and videos to the vector space, whereas a convolution or a recurrent neural network may be trained and used for mapping sequence data (e.g., sentences, time series, etc.) to the vector space. As discussed, in some embodiments, an existing vector space may be extended by adding one or more additional dimensions to the vector space (e.g., to enable the vector space to accommodate new types of data by mapping aspects of the new types of data to the additional dimensions of the vector space). In some embodiments, one or more additional machine learning models may be trained to map the new types of data to the additional dimensions of the vector space.

In some embodiments, neural networks (or other machine learning models) for each data type (or a set of data types) may be trained to predict categories of the content items that are provided as input to the neural networks (or other machine learning models). Layers from neural networks (e.g., trained neural networks) may be combined to learn a unified set of layers together. As an example, a multitask training scheme may be implemented, where inputs for each modalities/data types (e.g., text, audio, images, videos, etc.) are mapped to a single set of activations, which are then used to predict the categories (e.g., where categories are shared or highly overlapping between data types). In one use case, the neural networks may take an "X" shape, with multiple inputs feeding into a single activation layer, and multiple heads with losses being predicted from that layer. By sharing output weights, the neural networks may learn to predict vectors in the same vector space (e.g., rather than overloading the vector space).

In some embodiments, when machine learning models are trained to map data into a vector space (and do map data into the vector space and build an index for the data via the vector space), one or more of those machine learning models or other machine learning models may be used to facilitate search or other requests via the vector space. As an example, a query terms may be provided as input to one or more machine learning models to generate a query vector (or multiple query vectors), and the query vector(s) may be used to find the nearest item vectors stored in a vector database (e.g., vector database 138) representing the vector space. This may be made efficient through various approaches, such as brute force distance computation, distributed distance computation, pre-clustering vectors into buckets, quantizing vectors, KD-trees, dimensionality reduction + distance computation in lower dimensional spaces, or other approaches. That index may leverage existing hardware types to efficiently retrieve ranked results based on the vector representations. Additionally, or alternatively, distributed hardware may potentially be used to compute vector operations over the data at scale and merge results across a cluster of nodes.

In some embodiments, model subsystem 114 may obtain content items and cause one or more prediction models to be trained based on the content items to map data into a vector space. Vector space subsystem 112 may obtain information from the vector space to respond to one or more requests by predicting one or more locations (e.g., in the form of one or more vectors) that may be used to obtain the information from the vector space. As an example, the number of content items used to train the prediction models may be 500 or more content items, 1000 or more content items, 10000 or more content items, 100000 or more content items, 1000000 or more content items, or other number of training media items. One or more of the content items may each include multiple data types, such as two or more of text, metadata, image, audio, video, or other media types. Other data types included in such content items may include character data, monetary data, date and time data, binary strings, or other data types.

In some embodiments, model subsystem 114 may train multiple prediction models based on content items to map data into a vector space by providing at least a first portion of a content item as input to at least one of the prediction models and at least a second portion of the content item as input to at least another one of the prediction models. As an example, the first portion of the content item may correspond to a first data type (e.g., one of text, metadata, image, audio, or video), and the second portion of the content item may correspond to a second data type (e.g., another one of text, metadata, image, audio, or video). The first portion of the content item may be provided as input to a prediction model for mapping data of the first data type to the vector space (e.g., and not configured or designated for mapping data of the second data type to the vector space). The second portion of the content item may be provided as input to a prediction model for mapping data of the second data type to the vector space (e.g., and not configured or designated for mapping data of the first data type to the vector space). Additionally, or alternatively, a third portion of the content item (corresponding to a third data type) may be provided as input to a prediction model for mapping data of the third data type to the vector space (e.g., and not configured or designated for mapping data of at least one of the other data types to the vector space), a fourth portion of the content item (corresponding to a fourth data type) may be provided as input to a prediction model for mapping data of the fourth data type to the vector space (e.g., and not configured or designated for mapping data of at least one of the other data types to the vector space), and so on. In this way, for example, retraining or updating of each of the various prediction models used to generate the vector space may be facilitated. Where each prediction model processes data of a specific data type to facilitate mapping of at least a portion of a content item (corresponding to the data type) to the vector space, the data may be used to update one of the models at a time or, in some cases, all of the models jointly. As more data is accumulated in the database (representing the vector space), the update procedure may happen in the background and improve the vector space representation overall. In some embodiments, an index structure may be provided for searching the database (representing the vector space) such that the index structure is configured to enable multiple simultaneous vector spaces, allowing for the retraining and re-indexing to happen concurrently without affecting any ongoing searches in the database. In some embodiments, a first instance of the vector space may be utilized for ongoing searches, and a second instance of the vector space may be generated and utilized for retraining of prediction models and re-indexing. Upon re-indexing, vector space subsystem 112 may replace the first instance of the vector space with the re-indexed/second instance of the vector space for ongoing searches. In this way, for example, downtime associated with the search system may be minimized.

In some embodiments, model subsystem 114 may cause one or more prediction models to generate one or more vectors that may be used to map data to a vector space. In some embodiments, model subsystem 114 may provide a content item (or a portion thereof) to a prediction model to cause the prediction model to generate a vector. Vector space subsystem 112 may map the content item (or the portion thereof) to the vector space based on the generated vector. As an example, the content item may include one or more data types. In some embodiments, with respect to a content item including multiple data types, model subsystem 114 may provide at least a first portion of the content item (e.g., corresponding to a first data type) as input to a first prediction model to cause the first prediction model to generate a first vector, provide at least a second portion of the content item (e.g., corresponding to a second data type) as input to a second prediction model to cause the second prediction model to generate a second vector, and so on. Vector space subsystem 112 may map the content item (or the portions thereof) to the vector space based on the vectors generated by the prediction models (e.g., the first vector generated by the first prediction model, the second vector generated by the second prediction model, etc.). In some embodiments, vector space subsystem 112 may generate a resulting vector based on the vectors generated by the prediction models (e.g., the first vector generated by the first prediction model, the second vector generated by the second prediction model, etc.), and map the content item (or the portions thereof) to the vector space based on the resulting vector. In some embodiments, the vectors generated by the prediction models may be provided to a prediction model (e.g., one of the prediction models that generated the vectors or another prediction model) to cause the prediction model to generate the resulting vector, and vector space subsystem 112 may map the content item (or the portions thereof) to the vector space based on the resulting vector.

In some embodiments, the vectors generated by the prediction models may have the same number of dimensions as the resulting vector (e.g., all the vectors may have N dimensions). In some embodiments, the vectors generated by the prediction models may have the same number of dimensions as one another, but different from the resulting vector. As an example, all the prediction-model-generated vectors may have X dimensions, and the resulting vector may have Y dimensions. As further example, Y may be greater than X. In one use case, Y=X multiplied by the total number of the prediction-model-generated vectors. In another use case, Y<X multiplied by the total number of the prediction-model-generated vectors. In some embodiments, at least one of the vectors generated by the prediction models may have a different number of dimensions from another one of the vectors generated by the prediction models and from the resulting vector. As an example, the first vector may have X dimensions, the second vector may have Y dimensions, and the resulting vector may have Z dimensions. As a further example, Z may be greater than X or Y.

In some embodiments, request subsystem 116 may obtain a request for one or more results (e.g., a search request or other request). Vector space subsystem 112 may obtain information from the vector space based on the request and utilize the information to provide a response to the request. As an example the request may include one or more parameters. The parameters may include one or more search parameters such as keywords, a content item or identifier/location thereof (e.g., a content ID, a hyperlink or other pointer to the content item, etc.), logical operators (e.g., logical AND operators, logical OR operators, logical NOT operators, or other logical operators), or other parameters. In one use case, where the content item is an image, the image may be used for a search for similar images, content items having the same image or similar images, content items having similar concepts as concepts in the image, or other results. In another use case, where the content item is a video, the video may be used for a search for similar videos, content items having the same video or similar videos, content items having similar concepts as concepts in the video, or other results.

In some embodiments, vector space subsystem 112 may predict one or more locations (e.g., at or proximate to where requested results are mapped) within the vector space based on one or more parameters of a request, and provide, as a response to the request, information indicating one or more content items mapped to the predicted locations of the vector space (or to locations proximate the predicted locations). In some embodiments, vector space subsystem 112 may predict a region (within the vector space) for satisfying the request based on the parameters of the request. As an example, vector space subsystem 112 may obtain a predetermined distance threshold, and predict the region for satisfying the request based on the predicted locations and the predetermined distance threshold. In one use case, with respect to FIG. 2A, a location of a vector space (e.g., at least partially represented by dimensions 202, 204, and 206) between locations 207a-207d may be predicted to be a location at or proximate to locations at which content items relevant to a search request are mapped in the vector space. Vector space subsystem 112 may determine that locations 207a-207d are within the predetermined distance threshold from the predicted location, and, thus, may return information regarding the content items mapped to locations 207a-207d to respond to the request (e.g., returning content IDs of the content items, hyperlinks to the content items, summaries of the content items, the content items themselves, or other information).

As another example, vector space subsystem 112 may obtain multiple predetermined distance thresholds, and predict the region based on the predicted locations and the multiple predetermined distance thresholds. In one scenario, with respect to FIG. 2A, each of the predetermined distance thresholds may be associated with different one of the dimensions 202, 204, or 206 (or a different subset of dimensions that has less than all the currently-existing dimensions of the vector space). Vector space subsystem 112 may determine that locations 207a-207d are within each of the predetermined distance thresholds from the predicted location, and, thus, may return information regarding the content items mapped to locations 207a-207d to respond to the request (e.g., returning content IDs of the content items, hyperlinks to the content items, summaries of the content items, the content items themselves, or other information). In this way, for example, the different predetermined distance thresholds may take into account the varying differences between the dimensions of the vector space (and what they represent, e.g., aspects of different data types), the varying differences of the perspective of users for different data types (and what they deem to be relevant), or other differences.

In some embodiments, one or more vectors may be generated based on one or more parameters of a request (e.g., a search request or other request). Vector space subsystem 112 may predict one or more locations (e.g., at or proximate to where requested results are mapped) within the vector space based on the generated vectors, and provide, as a response to the request, information indicating one or more content items mapped to the predicted locations of the vector space (or to locations proximate the predicted locations). In some embodiments, model subsystem 112 may provide the request parameters (or a portion thereof) to a prediction model to cause the prediction model to generate the vectors, and vector space subsystem may predict the locations based on the generated vectors. As described herein, in some embodiments, the predicted locations and one or more predetermined thresholds may be utilized to determine a region within the vector space for satisfying the request, and vector space subsystem 112 may provide, as a response to the request, information indicating one or more content items mapped to the region.

In some embodiments, model subsystem 114 may provide at least a first portion of a request (e.g., parameters corresponding to a first data type) as input to a first prediction model to cause the first prediction model to generate a first vector, provide at least a second portion of the request (e.g., parameters corresponding to a second data type) as input to a second prediction model to cause the second prediction model to generate a second vector, and so on. Vector space subsystem 112 may predict one or more locations (e.g., at or proximate to where requested results are mapped) within the vector space based on the generated vectors, and provide, as a response to the request, information indicating one or more content items mapped to the predicted locations of the vector space (or to locations proximate the predicted locations). In some embodiments, vector space subsystem 112 may generate a resulting vector based on the vectors generated by the prediction models (e.g., the first vector generated by the first prediction model, the second vector generated by the second prediction model, etc.), and predict the locations within the vector space based on the resulting vector. In some embodiments, the vectors generated by the prediction models may be provided to a prediction model (e.g., one of the prediction models that generated the vectors or another prediction model) to cause the prediction model to generate the resulting vector, and vector space subsystem 112 may predict the locations within the vector space based on the resulting vector.

In some embodiments, vectors may be generated based on one or more parameters of a request (e.g., a search request or other request), and vector space subsystem 112 may perform vector summation or negation on vectors based on one or more logical operators of the request to generate a resulting vector. As an example, the request may include query terms, and the query terms may be connected by one or more logical operators. A vector summation may be performed on two vectors based on each of the two vectors being respectively generated from two query terms connected by a logical AND operator (e.g., "A" and "B"). A vector negation may be performed with respect to a vector, where the vector is generated from a query term or set of query terms that are connected to one or more other query terms by a logical NOT operator (e.g., "A" and "B" not "C"). Based on the resulting vector, vector space subsystem 112 may predict one or more locations within a vector space (at or proximate to where requested results are mapped). As described herein, in some embodiments, the predicted locations and one or more predetermined thresholds may be utilized to determine a region within the vector space for satisfying the request, and vector space subsystem 112 may provide, as a response to the request, information indicating one or more content items mapped to the region.

Model Training Via Reference Feedback

In some embodiments, model subsystem 114 may enable one or more prediction models to be trained. Training data used to train the prediction models may include (i) inputs to be provided to a prediction model (e.g., inputs provided to and processed by other prediction or other inputs), (ii) reference outputs that are to be derived from a prediction model's processing of such inputs (e.g., user-confirmed or user-provided outputs, outputs confirmed through one or more prediction models' processing of such inputs, outputs confirmed multiple times by processing of such inputs by respective sets of prediction models, or other reference outputs), (iii) reference indications of outputs that are not to be derived from a machine learning model's processing of such inputs (e.g., user indications that such outputs are inaccurate or other reference indications), or (iv) other training data.

In some embodiments, upon obtaining a set of content items, model subsystem 114 may cause a prediction model to generate predictions related to mapping of the content items (or portions thereof) into a vector space (e.g., predictions with respect to a single vector for each content item, multiple vectors for each content item, locations within the vector space onto which the content items are to be mapped, etc.). Model subsystem 114 may analyze those predictions against a set of reference feedback (e.g., obtained by feedback subsystem 118), such as reference predictions of a single vector for each content item, multiple vectors for each content item, locations within the vector space onto which the content items are to be mapped, or other desired outputs for use as a reference. In one use case, the reference outputs may be provided as input to the content item model (e.g., prior to, simultaneously with, or subsequent to providing the content items to the prediction model), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its mapping predictions. In another use case, accuracy or completeness indications with respect to the prediction model's predictions (e.g., whether a given prediction is accurate, how accurate or complete a given prediction is, etc.) may be provided to the prediction model, which, in turn, may utilize the accuracy or completeness indications to improve the accuracy or completeness of its mapping predictions.

In some embodiments, model subsystem 114 may provide content items to one or more prediction models to cause the prediction models to generate vectors (which indicate locations within a vector space or may be used to predict the locations) or other location-related predictions. As an example, each of the locations/location predictions being a location to which at least a portion of a content item of the content items is predicted to correspond. Feedback subsystem 118 may obtain a reference feedback set, and model subsystem 114 may cause the prediction models to be updated based on the location predictions and the reference feedback set. As an example, the reference feedback set include reference vectors or locations with respect to the vector space, and each of the reference vectors or locations may be a location to which at least a portion of a content item of the content items is confirmed to correspond. Model subsystem 114 may cause the prediction models to be updated by providing respective reference vectors/locations to the prediction models to cause the prediction models to be updated based on the respective reference vectors/locations. In some embodiments, model subsystem 114 may cause the prediction models to be updated by providing respective reference vectors/locations and the prediction models' predictions to the prediction models to cause the prediction models to be updated based on the respective reference vectors/locations and the prediction models' predictions. As an example, a prediction model may determine similarities or differences between the location predictions and their corresponding reference vectors/locations and updates itself based on the determined similarities or differences (e.g., by learning how to arrive at a correct prediction that is the same or similar to the reference vectors/locations).

Examples Flowcharts

Figure 3:
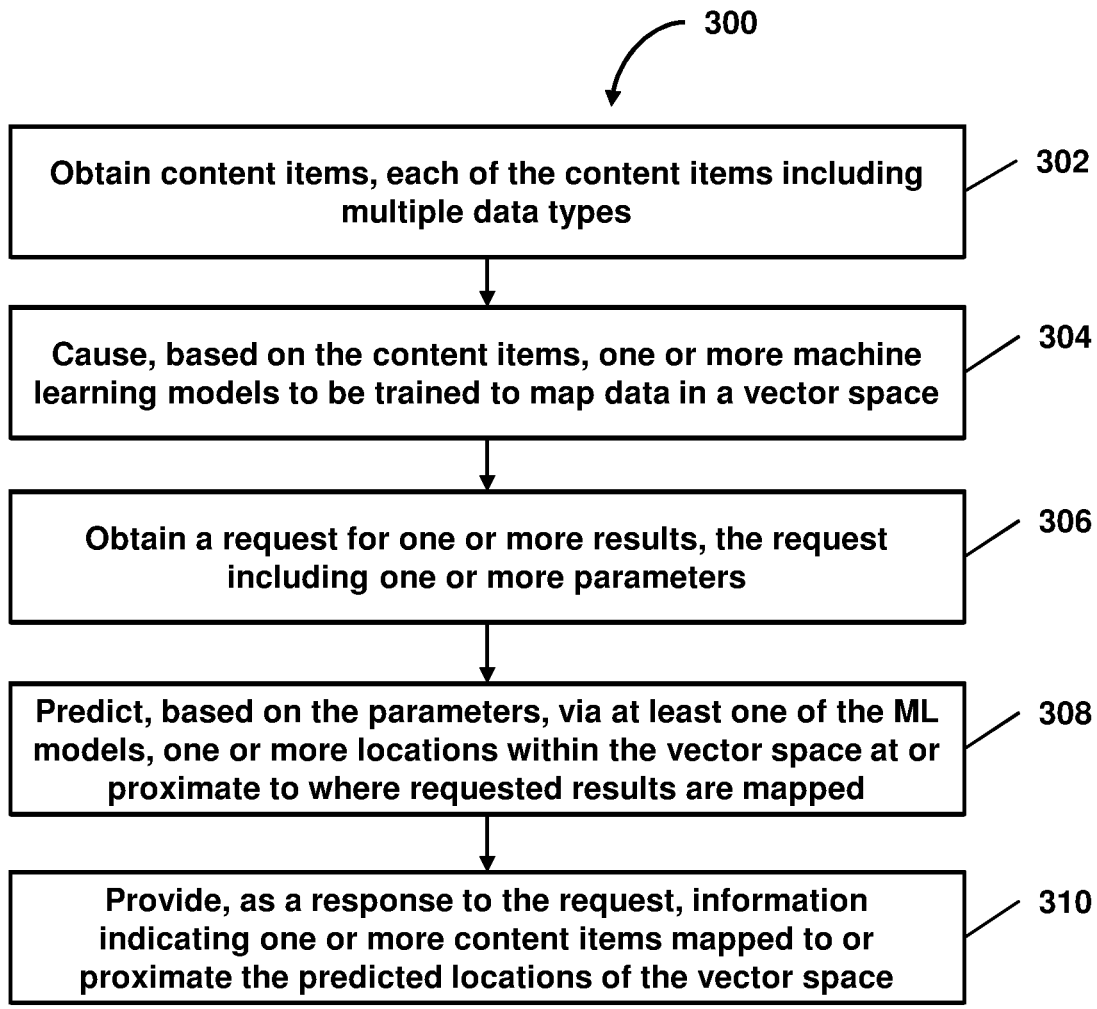
FIG. 3 shows a flowchart of a method of facilitating prediction-model-based mapping of content items in a vector space and retrieval of information from the vector space, in accordance with one or more embodiments.
Figure 4:
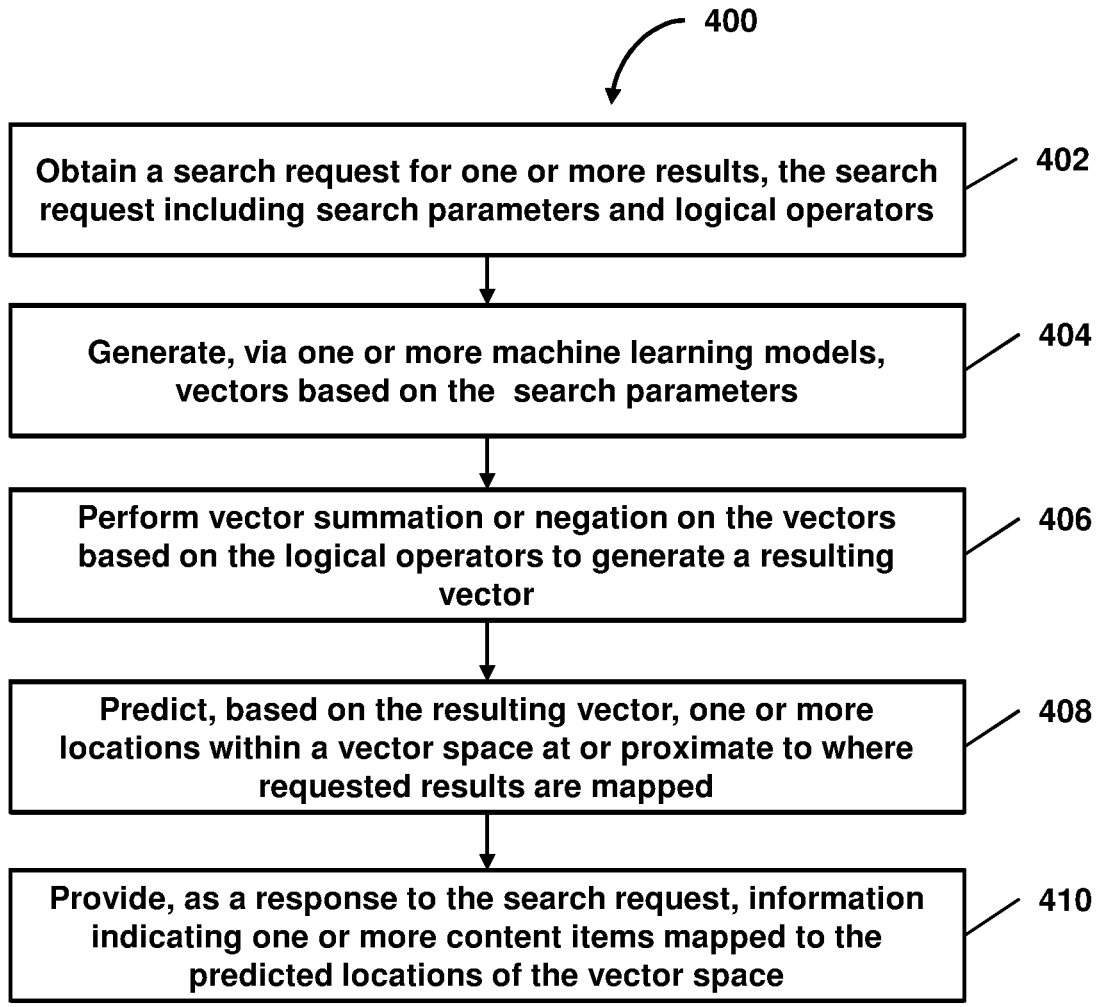
FIG. 4 shows a flowchart of a method of facilitating search of a vector space, in accordance with one or more embodiments.

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating prediction-model-based mapping of content items in a vector space and retrieval of information from the vector space, in accordance with one or more embodiments.

In an operation 302, content items may be obtained. As an example, two or more content items may be obtained, and each of those content items may include multiple data types. The data types may include text, metadata, image, audio, video, integer data, character data, monetary data, date and time data, binary strings, or other data types. Operation 302 may be performed by a model subsystem that is the same as or similar to model subsystem 114, in accordance with one or more embodiments.

In an operation 304, one or more machine learning models may be caused to be trained based on the content items to map data in a vector space. Operation 304 may be performed by a model subsystem that is the same as or similar to model subsystem 114, in accordance with one or more embodiments.

In an operation 306, a request for one or more results may be obtained. As an example the request may include one or more parameters. The parameters may include one or more search parameters such as keywords, a content item or identifier/location thereof (e.g., a content ID, a hyperlink or other pointer to the content item, etc.), or other parameters. In one use case, where the content item is an image, the image may be used for a search for similar images, content items having the same image or similar images, content items having similar concepts as concepts in the image, or other results. In another use case, where the content item is a video, the video may be used for a search for similar videos, content items having the same video or similar videos, content items having similar concepts as concepts in the video, or other results. Operation 306 may be performed by a request subsystem that is the same as or similar to request subsystem 116, in accordance with one or more embodiments.

In an operation 308, one or more locations within the vector space (at or proximate to where requested results are mapped) may be predicted based on the parameters. As an example, the locations within the vector space may be predicted based on the parameters via at least one of the machine learning models (previously trained to map data in the vector space). Operation 308 may be performed by a vector space subsystem that is the same as or similar to vector space subsystem 112, in accordance with one or more embodiments.

In an operation 310, information indicating one or more content items (mapped to the predicted locations of the vector space or to locations proximate the predicted locations) may be provided as a response to the request. As an example, the content items mapped to the predicted locations (or to locations proximate the predicted locations) may be the results predicted to satisfy the request. At least one of the content items may include multiple data types, such as two or more of text, metadata, image, audio, video, integer data, character data, monetary data, date and time data, binary strings, or other data types. Operation 310 may be performed by a vector space subsystem that is the same as or similar to vector space subsystem 112, in accordance with one or more embodiments.

FIG. 4 shows a flowchart of a method 400 of facilitating search of a vector space, in accordance with one or more embodiments.

In an operation 402, a search request for one or more results may be obtained. As an example, the search request may include search parameters and logical operators. The search parameters may include search parameters such as keywords, a content item or identifier/location thereof (e.g., a content ID, a hyperlink or other pointer to the content item, etc.), or other parameters. The logical operators may include one or more logical AND operators, logical OR operators, logical NOT operators, or other logical operators. Operation 402 may be performed by a request subsystem that is the same as or similar to request subsystem 116, in accordance with one or more embodiments.

In an operation 404, vectors may be generated via one or more machine learning models based on the search parameters. As an example, where the search parameters include query terms, each of the vectors may be generated based on one or more of the query terms. A first vector may be generated based on one of the query terms or set of the query terms, a second vector may be generated based on another one of the query terms or set of the query terms, and so on. Operation 404 may be performed by a model subsystem that is the same as or similar to model subsystem 114, in accordance with one or more embodiments.

In an operation 406, vector summation or negation may be performed on the vectors based on the logical operators to generate a resulting vector. As an example, the search parameters may include query terms, and the query terms may be connected by one or more logical operators. A vector summation may be performed on two vectors based on each of the two vectors being respectively generated from two query terms connected by a logical AND operator (e.g., "A" and "B"). A vector negation may be performed with respect to a vector, where the vector is generated from a query term or set of query terms that are connected to one or more other query terms by a logical NOT operator (e.g., "A" and "B" not "C"). Operation 406 may be performed by a vector space subsystem that is the same as or similar to vector space subsystem 112, in accordance with one or more embodiments.

In an operation 408, one or more locations within a vector space (at or proximate to where requested results are mapped) may be predicted based on the resulting vector. As an example, the resulting vector may indicate at least one of the predicted locations within the vector space. As another example, the predicted locations (other than the at least one location) may include locations of the vector space that are within a predetermined threshold distance of the at least one location. Operation 408 may be performed by a vector space subsystem that is the same as or similar to vector space subsystem 112, in accordance with one or more embodiments.

In an operation 410, information indicating one or more content items (mapped to the predicted locations of the vector space or to locations proximate the predicted locations) may be provided as a response to the search request. As an example, the content items mapped to the predicted locations (or to locations proximate the predicted locations) may be the results predicted to satisfy the search request. At least one of the content items may include multiple data types, such as two or more of text, metadata, image, audio, video, integer data, character data, monetary data, date and time data, binary strings, or other data types. Operation 410 may be performed by a vector space subsystem that is the same as or similar to vector space subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, vector database(s) 138, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining content items, each of the content items comprising multiple data types, the multiple data types comprising three or more of text, metadata, image, audio, or video; causing, based on the content items, prediction models to be trained to map data in a vector space by providing at least a first portion of each of the content items as input to at least one of the prediction models and providing at least a second portion of each of the content items as input to at least another one of the prediction models, each of the first portions corresponding to a first data type, and each of the second portions corresponding to a second data type, a first dimension of the vector space corresponds to the first data type, a second dimension of the vector space corresponds to the second data type, and a third dimension of the vector space corresponds to a third data type, and the first data type, the second data type, and the third data type respectively corresponds to a different one of text, metadata, image, audio, or video; obtaining a search request for one or more multi-data-type content items, the search request comprising one or more search parameters, a multi-data-type content item comprising at least some of the multiple data types; predicting, via at least one of the prediction models, a region within the vector space for satisfying the search request, the region being predicted based on the one or more search parameters; and providing, as a response to the search request, information indicating one or more content items mapped to the predicted region.

2. The method of embodiment 1, further comprising: processing, via the prediction models, the content items to generate location predictions with respect to the vector space, each of the location predictions being a location to which at least a portion of a content item of the content items is predicted to correspond; obtaining a reference feedback set, the reference feedback set comprising reference locations with respect to the vector space, each of the reference locations being a location to which at least a portion of a content item of the content items is confirmed to correspond; and updating the prediction models based on the location predictions and the reference feedback set.

3. The method of embodiment 2, wherein a prediction model of the prediction models (i) determines similarities or differences between the location predictions and their corresponding reference locations and (ii) updates the prediction model based on the determined similarities or differences.

4. The method of any of embodiments 1-3, wherein predicting the region comprises: determining a location within the vector space based on the one or more search parameters, the determined location corresponding to a predetermined relevance threshold for the search request; and predicting the region within the vector space based on the determined location.

5. The method of embodiment 4, wherein predicting the region comprises: obtaining a predetermined distance threshold; and predicting the region within the vector space based on the determined location and the predetermined distance threshold.

6. The method of any of embodiments 1-5, wherein the search request comprises one or more logical operators, and the one or more search parameters comprises multiple search parameters, the method further comprising: generating multiple vectors based on the multiple search parameters, at least one of the multiple vectors being generated based on at least one of the multiple search parameters, and at least another one of the multiple vectors being generated based on at least another one of the multiple search parameters; performing vector summation or negation on the multiple vectors based on the one or more logical operators to generate a resulting vector; and predicting the region within the vector space based on the resulting vector.

7. The method of any of embodiments 1-6, further comprising: adding a dimension to the vector space subsequent to at least some content items being mapped in the vector space, the added dimension corresponding to a given data type.

8. The method of any of embodiments 1-7, further comprising: obtaining a first content item comprising at least some of the multiple data types; processing, via a first prediction model, at least a first portion of the first content item to generate a first vector corresponding to at least the first portion of the first content item; processing, via a second prediction model, at least a second portion of the first content item to generate a second vector corresponding to at least the second portion of the first content item; and mapping the first content item in the vector space based on the first vector and the second vector.

9. The method of embodiment 8, wherein mapping the first content item in the vector space comprises: performing vector summation on the first vector and the second vector to generate a resulting vector; and mapping the first content item in the vector space based on the resulting vector.

10. The method of embodiment 8, wherein mapping the first content item in the vector space comprises: processing, via a third prediction model, the first vector and the second vector to generate a resulting vector; and mapping the first content item in the vector space based on the resulting vector.

11. A method comprising: obtaining content items, each of the content items comprising multiple data types; causing, based on the content items, prediction models to be trained to map data in a vector space by providing at least a first portion of each of the content items as input to at least one of the prediction models and providing at least a second portion of each of the content items as input to at least another one of the prediction models; obtaining a request for one or more results, the request comprising one or more parameters; predicting one or more locations within the vector space based on the one or more parameters; and providing, as a response to the request, information indicating one or more content items mapped to the predicted one or more locations of the vector space or to one or more other locations proximate the predicted one or more locations.

12. The method of embodiment 11, further comprising: processing, via the prediction models, the content items to generate location predictions with respect to the vector space, each of the location predictions being a location to which at least a portion of a content item of the content items is predicted to correspond; obtaining a reference feedback set, the reference feedback set comprising reference locations with respect to the vector space, each of the reference locations being a location to which at least a portion of a content item of the content items is confirmed to correspond; and updating the prediction models based on the location predictions and the reference feedback set.

13. The method of embodiment 12, wherein a prediction model of the prediction models (i) determines similarities or differences between the location predictions and their corresponding reference locations and (ii) updates the prediction model based on the determined similarities or differences.

14. The method of any of embodiments 11-13, further comprising: predicting, based on the predicted one or more locations, a region within the vector space for satisfying the request.

15. The method of embodiment 14, further comprising: obtaining a predetermined distance threshold; and predicting the region within the vector space for satisfying the request based on the predicted one or more locations and the predetermined distance threshold.

16. The method of any of embodiments 11-15, wherein the request comprises one or more logical operators, and the one or more parameters comprises multiple parameters, the method further comprising: generating multiple vectors based on the multiple parameters, at least one of the multiple vectors being generated based on at least one of the multiple parameters, and at least another one of the multiple vectors being generated based on at least another one of the multiple parameters; performing vector summation or negation on the multiple vectors based on the one or more logical operators to generate a resulting vector; and predicting the one or more locations within the vector space based on the resulting vector.

17. The method of any of embodiments 11-16, further comprising: adding a dimension to the vector space subsequent to at least some content items being mapped in the vector space, the added dimension corresponding to a given data type.

18. The method of any of embodiments 11-17, further comprising: obtaining a first content item comprising at least some of the multiple data types; processing, via a first prediction model, at least a first portion of the first content item to generate a first vector corresponding to at least the first portion of the first content item; processing, via a second prediction model, at least a second portion of the first content item to generate a second vector corresponding to at least the second portion of the first content item; and mapping the first content item in the vector space based on the first vector and the second vector.

19. The method of embodiment 18, wherein mapping the first content item in the vector space comprises: performing vector summation on the first vector and the second vector to generate a resulting vector; and mapping the first content item in the vector space based on the resulting vector.

20. The method of embodiment 18, wherein mapping the first content item in the vector space comprises: processing, via a third prediction model, the first vector and the second vector to generate a resulting vector; and mapping the first content item in the vector space based on the resulting vector.

21. A tangible, non-transitory, machine-readable medium storing instructions that when executed by a data processing apparatus cause the data processing apparatus to perform operations comprising those of any of embodiments 1-20.

22. A system, comprising: one or more processors; and memory storing instructions that when executed by the processors cause the processors to effectuate operations comprising those of any of embodiments 1-20.

What is claimed is:

1. A method comprising:
    obtaining content items, each of the content items comprising multiple data types, the multiple data types comprising three or more of text, metadata, image, audio, or video;
    causing, based on the content items, multiple neural networks to be trained to map data in a vector space by providing at least a first portion of the content items as input to at least one of multiple neural networks and providing at least a second portion of each of the content items as input to at least another one of the multiple neural networks,
    each of the first portions corresponding to a first data type, and each of the second portions corresponding to a second data type different than the first data type,
    a first dimension of the vector space corresponds to the first data type, a second dimension of the vector space corresponds to the second data type, and a third dimension of the vector space corresponds to a third data type,
    wherein the multiple neural networks are configured to share a common set of activations such that inputs for the first and second data types provided to the multiple neural networks are mapped by the multiple neural networks to the common set of activations;
    obtaining a search request for one or more multi-data-type content items, the search request comprising one or more search parameters, a multi-data-type content item comprising at least some of the multiple data types;
    identifying multiple different predefined distance thresholds within the vector space assigned to the multiple data types and corresponding to multiple different dimensions, respectively;
    predicting, via at least one of the multiple neural networks and the common set of activations, a region within the vector space for satisfying the search request, the region being predicted based on the one or more search parameters;
    determining that the region is within each of the multiple different distance thresholds corresponding to the plurality of different data types; and
    in response to the determining, providing, as a response to the search request, information indicating one or more content items mapped to the predicted region of the vector space.

2. The method of claim 1, further comprising:
    processing, via the multiple neural networks, the content items to generate location predictions with respect to the vector space, each of the location predictions being a location to which at least a portion of a content item of the content items is predicted to correspond;
    obtaining a reference feedback set, the reference feedback set comprising (i) reference locations with respect to the vector space, each of the reference locations being a location to which at least a portion of a content item of the content items is confirmed to correspond, and (ii) reference indications of outputs that are not to be derived from a machine learning model's processing of the at least a portion of a content item of the 1000 content items; and
    updating the multiple neural networks based on the location predictions and the reference feedback set.

3. The method of claim 2, wherein a neural network of the multiple neural networks (i) determines similarities or differences between the location predictions and their corresponding reference locations and (ii) updates the neural network based on the determined similarities or differences.

4. The method of claim 1, wherein predicting the region comprises:
    determining a location within the vector space based on the one or more search parameters, the determined location corresponding to a predetermined relevance threshold for the search request; and
    predicting the region within the vector space based on the determined location.

5. The method of claim 4, wherein predicting the region comprises:
    obtaining a predetermined distance threshold; and
    predicting the region within the vector space based on the determined location and the predetermined distance threshold.

6. The method of claim 1, wherein the search request comprises one or more logical operators, and the one or more search parameters comprises multiple search parameters, the method further comprising:
    generating multiple vectors based on the multiple search parameters, at least one of the multiple vectors being generated based on at least one of the multiple search parameters, and at least another one of the multiple vectors being generated based on at least another one of the multiple search parameters;

performing vector summation or negation on the multiple vectors based on the one or more logical operators to generate a resulting vector; and predicting the region within the vector space based on the resulting vector.

7. The method of claim 1, further comprising:

adding a dimension to the vector space subsequent to at least some content items being mapped in the vector space, the added dimension corresponding to a given data type.

8. The method of claim 1, further comprising:

obtaining a first content item comprising at least some of the multiple data types;

processing, via a first neural network, at least a first portion of the first content item to generate a first vector corresponding to at least the first portion of the first content item;

processing, via a second neural network, at least a second portion of the first content item to generate a second vector corresponding to at least the second portion of the first content item; and mapping the first content item in the vector space based on the first vector and the second vector.

9. The method of claim 8, wherein mapping the first content item in the vector space comprises:

performing vector summation on the first vector and the second vector to generate are sulting vector; and mapping the first content item in the vector space based on the resulting vector.

10. The method of claim 8, wherein mapping the first content item in the vector space comprises:

processing, via a third neural network, the first vector and the second vector to generate are sulting vector; and mapping the first content item in the vector space based on the resulting vector.

11. A system comprising:

a computer system that comprises one or more processors programmed with computer program instructions that, when executed, cause the computer system to:

obtain multiple content items, each of the multiple content items comprising multiple data types;

cause, based on the multiple content items, multiple prediction models to be trained to map data in a vector space by providing at least a first portion of each of the multiple content items as input to at least one of the multiple prediction models and providing at least a second portion of each of the multiple content items as input to at least another one of the multiple prediction models, wherein each of the first portions corresponds to a first data type, and each of the second portions corresponds to a second data type different from the first data type;

wherein the multiple prediction models are configured to share a common set of activations such that inputs for the first and second data types provided to the multiple prediction models are mapped to the common set of activations;

obtain a request for one or more results, the request comprising one or more parameters;

identify multiple different predefined distance thresholds within the vector space assigned to the multiple data types and corresponding to multiple different dimensions, respectively;

predict, via at least one prediction model of the multiple prediction models and the common set of activations, a region within the vector space for satisfying the search request based on the one or more parameters;

determine that the region is within each of the multiple different distance thresholds assigned to the plurality of different data types; and in response to the determination, provide, as a response to the request, information indicating one or more content items mapped to the predicted region of the vector space.

12. The system of claim 11, wherein the computer system is caused to:

process, via the multiple prediction models, the multiple content items to generate location predictions with respect to the vector space, each of the location predictions being a location to which at least a portion of a content item of the multiple content items is predicted to correspond;

obtain a reference feedback set, the reference feedback set comprising (i) reference locations with respect to the vector space, each of the reference locations being a location to which at least a portion of a content item of the multiple content items is confirmed to correspond, and (ii) reference indications of outputs that are not to be derived from a prediction model's processing of the multiple content items; and update the multiple prediction models based on the location predictions and the reference feedback set.

13. The system of claim 12, wherein a prediction model of the multiple prediction models (i) determines similarities or differences between the location predictions and their corresponding reference locations and (ii) updates the prediction model based on the determined similarities or differences.

14. The system of claim 11, wherein the request comprises one or more logical operators, and the one or more parameters comprises multiple parameters, and wherein the computer system is caused to:

generate multiple vectors based on the multiple parameters, at least one of the multiple vectors being generated based on at least one of the multiple parameters, and at least another one of the multiple vectors being generated based on at least another one of the multiple parameters;

perform vector summation or negation on the multiple vectors based on the one or more logical operators to generate a resulting vector; and predict the one or more locations within the vector space based on the resulting vector.

15. The system of claim 11, wherein the computer system is caused to:

obtain a first content item comprising at least some of the multiple data types;

process, via a first prediction model, at least a first portion of the first content item to generate a first vector corresponding to at least the first portion of the first content item;

process, via a second prediction model, at least a second portion of the first content item to generate a second vector corresponding to at least the second portion of the first content item: and map the first content item in the vector space based on the first vector and the second vector.

16. A method being implemented by a computer system that comprises one or more physical processors executing computer program instructions that, when executed, perform the method, the method comprising:

obtaining multiple content items, each of the multiple content items comprising multiple data types;

causing, based on the multiple content items, multiple prediction models to be trained to map data in a vector space by providing at least a first portion of each of the multiple content items as input to at least one of the multiple prediction models and providing at least a second portion of each of the multiple content items as input to at least another one of the multiple prediction models, wherein each of the first portions corresponds to a first data type, and each of the second portions corresponds to a second data type different from the first data type;

wherein the multiple prediction models are configured to share a common set of activations such that inputs for the first and second data types provided to the multiple prediction models are mapped to the common set of activations;

obtaining a request for one or more results, the request comprising one or more parameters; identifying multiple different predefined distance thresholds within the vector space assigned to the multiple data types and corresponding to multiple different dimensions, respectively;

predicting, via at least one prediction model of the multiple prediction models and the common set of activations, a region within the vector space for satisfying the search request based on the one or more parameters;

determining that the region is within each of the multiple different distance thresholds corresponding to the plurality of different data types; and in response to the determination, providing, as a response to the request, information indicating one or more content items mapped to the predicted region of the vector space.

17. The method of claim 16, further comprising:

processing, via the multiple prediction models, the multiple content items to generate location predictions with respect to the vector space, each of the location predictions being a location to which at least a portion of a content item of the multiple content items is predicted to correspond;

obtaining a reference feedback set, the reference feedback set comprising (i) reference locations with respect to the vector space, each of the reference locations being a location to which at least a portion of a content item of the multiple content items is confirmed to correspond, and (ii) reference indications of outputs that are not to be derived from a prediction model's processing of the multiple content items: and updating the multiple prediction models based on the location predictions and the reference feedback set.

18. The method of claim 17, wherein a prediction model of the multiple prediction models (i) determines similarities or differences between the location predictions and their corresponding reference locations and (ii) updates the prediction model based on the determined similarities or differences.

19. The method of claim 16, wherein the request comprises one or more logical operators, and the one or more parameters comprises multiple parameters, the method further comprising:

generating multiple vectors based on the multiple parameters, at least one of the multiple vectors being generated based on at least one of the multiple parameters, and at least another one of the multiple vectors being generated based on at least another one of the multiple parameters;

performing vector summation or negation on the multiple vectors based on the one or more logical operators to generate a resulting vector; and predicting the one or more locations within the vector space based on the resulting vector.

20. The method of claim 16, further comprising:

obtaining a first content item comprising at least some of the multiple data types;

processing, via a first prediction model, at least a first portion of the first content item to generate a first vector corresponding to at least the first portion of the first content item;

processing, via a second prediction model, at least a second portion of the first content item to generate a second vector corresponding to at least the second portion of the first content item; and mapping the first content item in the vector space based on the first vector and the second vector.

* * * * *